US012625545B2

(12) United States Patent　　　　(10) Patent No.:　US 12,625,545 B2

Ollila　　　　　　　　　　　　　　　 (45) Date of Patent:　　May 12, 2026

(54) EMPLOYING DIFFERENT ITERATIONS OF IMAGE RESTORATION TECHNIQUES ON DIFFERENT IMAGE REGIONS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 384 days.

(21) Appl. No.: 18/182,800

(22) Filed: Mar. 13, 2023

(65) Prior Publication Data

US 2024/0310903 A1　　Sep. 19, 2024

(51) Int. Cl.
| | |
|---|---|
| *G06F 3/01* | (2006.01) |
| *G06F 3/14* | (2006.01) |
| *G06T 3/4015* | (2024.01) |
| *G06T 3/4053* | (2024.01) |
| *G06T 5/70* | (2024.01) |
| *G06T 5/73* | (2024.01) |
| *G06T 5/77* | (2024.01) |
| *G06V 10/25* | (2022.01) |
| *G09G 3/00* | (2006.01) |

(52) U.S. Cl.
CPC ................ *G06F 3/013* (2013.01); *G06F 3/14* (2013.01); *G06T 3/4015* (2013.01); *G06T 3/4053* (2013.01); *G06T 5/70* (2024.01); *G06T 5/73* (2024.01); *G06T 5/77* (2024.01); *G06V 10/25* (2022.01); *G09G 3/003* (2013.01); *G06T 2207/20084* (2013.01); *G09G 2320/0257* (2013.01); *G09G 2340/14* (2013.01); *G09G 2354/00* (2013.01)

(58) Field of Classification Search
CPC ..... G06F 3/013; G06T 3/4015; G06T 3/4053; G06T 5/70; G06T 5/73; G06T 5/77; G06V 10/25; G09G 2320/0257
See application file for complete search history.

(56) References Cited

U.S. PATENT DOCUMENTS

| | | | |
|---|---|---|---|
| 2014/0247277 A1* | 9/2014 | Guenter .................. | G06T 11/00 |
| | | | 345/611 |
| 2017/0024866 A1* | 1/2017 | Watanabe ................. | G06T 5/73 |
| 2017/0277112 A1* | 9/2017 | Ohata ................ | G03G 21/1652 |
| 2018/0122048 A1* | 5/2018 | Wang ....................... | G06N 3/08 |
| 2020/0064631 A1* | 2/2020 | Robbins ............. | G02B 27/0093 |
| 2022/0222505 A1* | 7/2022 | Jiang ..................... | H04N 19/86 |

\* cited by examiner

*Primary Examiner* — Sanghyuk Park

(74) *Attorney, Agent, or Firm* — Ziegler IP Law Group, LLC.

(57)　　　　　　ABSTRACT

Disclosed is a display apparatus with at least one display or projector; a gaze-tracking means; and at least one processor configured to process gaze-tracking data, collected by the gaze-tracking means, to determine a gaze direction of a user; identify a gaze region and a peripheral region within an image that is to be displayed by the at least one display or projector, based on the gaze direction; apply at least one image restoration technique on the image in an iterative manner such that M iterations of the at least one image restoration technique are applied on the gaze region, and N iterations of the at least one image restoration technique are applied on the peripheral region, M being different from N; and control the at least one display or projector to display the image having the at least one image restoration technique applied thereon.

18 Claims, 5 Drawing Sheets

DETERMINE GAZE DIRECTION
502

IDENTIFY GAZE REGION AND PERIPHERAL REGION
504

APPLY DIFFERENT IERATIONS OF IMAGE RESTORATION
TECHNIQUE(S) ON DIFFERENT REGIONS
506

DISPLAY IMAGE
508

EMPLOYING DIFFERENT ITERATIONS OF IMAGE RESTORATION TECHNIQUES ON DIFFERENT IMAGE REGIONS

TECHNICAL FIELD

The present disclosure relates to display apparatuses employing different iterations of image restoration techniques on different image regions. The present disclosure also relates to methods for image restoration employing different iterations of image restoration techniques on different image regions.

BACKGROUND

Conventionally, in various types of display systems and display units, images are displayed on a display screen, for viewing by a user. Typically, the images that are to be displayed are required to have a high image quality in terms of all aspects associated with the image quality such as brightness, sharpness, saturation, clarity, and the like, thus, ensuring that objects represented in the images appear to be sharp and well defined.

However, oftentimes the images are of low quality in terms of the said aspects of the image quality. The reason for such low quality may, for example, be blurriness in the images, bad lighting at a time of capturing the images, presence of noise in the images, and the like. Such issues in the images can be corrected to some extent by image restoration techniques such as deblurring, denoising, demosaicking, artifact removal, resolution enhancement, and the like.

Although, there are existing some solutions of image restoration for enhancing the image quality, these existing solutions require heavy processing capabilities. For example, some existing solutions perform plug-and-play image restoration, which utilises neural network-based learning. Such solutions often require priors which may not be suitably available, and thus a performance of such solutions is limited. Moreover, some of the existing solutions oftentimes fail to enhance the image quality rapidly and efficiently in scenarios where a plurality of images are to be enhanced quickly one after the other, so as to be displayed in the display apparatus.

Therefore, in light of the foregoing discussion, there exists a need to overcome the aforementioned drawbacks associated with existing solutions for image restoration.

SUMMARY

The present disclosure seeks to provide a display apparatus. The present disclosure also seeks to provide a method for image restoration. An aim of the present disclosure is to provide a solution that overcomes at least partially the problems encountered in prior art.

In one aspect, an embodiment of the present disclosure provides a display apparatus comprising:
- at least one display or projector;
- a gaze-tracking means; and
- at least one processor configured to:
  - process gaze-tracking data, collected by the gaze-tracking means, to determine a gaze direction of a user;
  - identify a gaze region and a peripheral region within an image that is to be displayed by the at least one display or projector, based on the gaze direction;
  - apply at least one image restoration technique on the image in an iterative manner such that a number of iterations of the at least one image restoration technique applied on the gaze region is different from a number of iterations of the at least one image restoration technique applied on the peripheral region; and
  - control the at least one display or projector to display the image having the at least one image restoration technique applied thereon.

In another aspect, an embodiment of the present disclosure provides a method for image restoration, the method comprising:
- processing gaze-tracking data, collected by a gaze-tracking means, for determining a gaze direction of a user;
- identifying a gaze region and a peripheral region within an image that is to be displayed by an at least one display or projector, based on the gaze direction;
- applying at least one image restoration technique on the image in an iterative manner such that a number of iterations of the at least one image restoration technique applied on the gaze region is different from a number of iterations of the at least one image restoration technique applied on the peripheral region; and
- controlling the at least one display or projector to display the image having the at least one image restoration technique applied thereon.

Embodiments of the present disclosure substantially eliminate or at least partially address the aforementioned problems in the prior art, and enable image restoration to achieve high image quality in an efficient manner that reduces a processing burden on the at least one processor and increases the speed of image restoration at lower processing costs.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3A illustrates an image upon which a de-blurring technique is to be applied, while

FIG. 4A illustrates an image upon which a de-noising technique is to be applied, while

Figure 1:
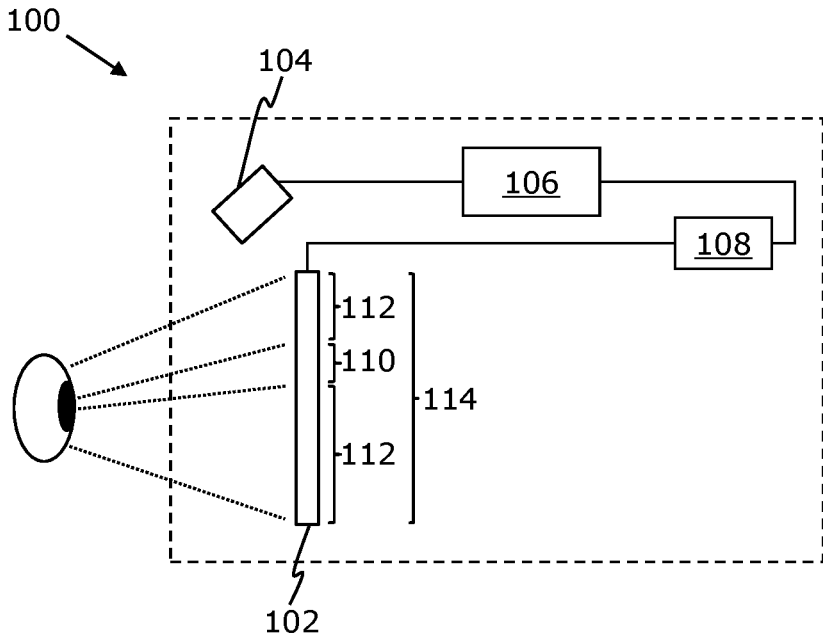
FIG. 1 illustrates a schematic diagram of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:

at least one display or projector;

a gaze-tracking means; and at least one processor configured to:

process gaze-tracking data, collected by the gaze-tracking means, to determine a gaze direction of a user;

identify a gaze region and a peripheral region within an image that is to be displayed by the at least one display or projector, based on the gaze direction;

apply at least one image restoration technique on the image in an iterative manner such that a number of iterations of the at least one image restoration technique applied on the gaze region is different from a number of iterations of the at least one image restoration technique applied on the peripheral region; and control the at least one display or projector to display the image having the at least one image restoration technique applied thereon.

In another aspect, an embodiment of the present disclosure provides a method for image restoration, the method comprising:

processing gaze-tracking data, collected by a gaze-tracking means, for determining a gaze direction of a user;

identifying a gaze region and a peripheral region within an image that is to be displayed by an at least one display or projector, based on the gaze direction;

applying at least one image restoration technique on the image in an iterative manner such that a number of iterations of the at least one image restoration technique applied on the gaze region is different from a number of iterations of the at least one image restoration technique applied on the peripheral region; and controlling the at least one display or projector to display the image having the at least one image restoration technique applied thereon.

In other words, M iterations of the at least one image restoration technique are applied on the gaze region, and N iterations of the at least one image restoration technique are applied on the peripheral region, M being different from N.

The present disclosure provides the aforementioned display apparatus and the aforementioned method for image restoration. Herein, the at least one image restoration technique is applied to the image in a targeted iterative manner such that different regions of the image undergo a different number of iterations of the at least one image restoration technique, as required. In this way, the (entire) image is not subjected to a high number of iterations and fewer iterations of image restoration technique(s) are applied in regions where an increased number of iterations does not provide a significant improvement in image quality. Hence, a load on the at least one processor significantly reduces, while producing a high quality and visually aesthetic image after the at least one image restoration technique is applied thereon. Moreover, reducing the load on the at least one processor improves the efficiency and speed of image restoration. Thus, the display apparatus is able to provide a high-quality and realistic visual experience to a user in real time or near-real time. Indeed different regions of the image is identified based on direction of gaze. Region on which a user looks at given time is referred as gaze region and reminder of the image is referred as peripheral region. Since human perception is different for those regions the regions can be treated differently. In an example gaze region is applied more iterations of image restoration technique than the peripheral region. This way the image, after the iterations, is perceived by the user to be good quality even the regions have different picture quality.

Throughout the present disclosure, the term "display apparatus" refers to specialized equipment that is configured to present an extended-reality (XR) environment to the user when the display apparatus in operation is worn by the user on his/her head. In such an instance, the display apparatus acts as a device (for example, such as an XR headset, a pair of XR glasses, and the like) that is operable to present a visual scene of the XR environment to the user. Commonly, the "display apparatus" is also referred to as a "head-mounted display apparatus". Throughout the present disclosure, the term "extended-reality" encompasses virtual reality (VR), augmented reality (AR), mixed reality (MR), and the like.

The term "at least one display or projector" encompasses "at least one display", "at least one projector", and "at least one display and at least one projector". Furthermore, the term "at least one display" refers to "one display" in some implementations, and to "a plurality of displays" in some other implementations. Likewise, the term "at least one projector" refers to "one projector" in some implementations, and to "a plurality of projectors" in some other implementations.

Optionally, the at least one display is implemented as at least one of: a Liquid Crystal Display (LCD), a Light Emitting Diode (LED)-based display, an Organic LED (OLED)-based display, a micro OLED-based display, and a Liquid Crystal on Silicon (LCoS)-based display. Optionally, when the display apparatus comprises the at least one projector, the image is projected onto a projection screen or directly onto retinas of the user's eyes. The image could be projected onto the projection screen from either a back side of the projection screen or from a front side of the projection screen. Optionally, the at least one projector is implemented as at least one of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector. Optionally, the image rendering surface of the projector is a front surface of the projection screen or a surface within the projector (for the direct retinal projection case).

Throughout the present disclosure, the term "gaze-track-ing means" refers to a specialized equipment for determin-ing the gaze direction of the user, when the display apparatus in operation is worn by the user. The gaze-tracking means could be implemented as contact lenses with sensors, cam-eras monitoring a position, a size and/or a shape of a pupil of a given eye of the user, and the like. Such gaze-tracking means are well-known in the art. The gaze-tracking means is configured to collect the gaze-tracking data, which con-stitutes the information indicative of the gaze direction of the user. Then, the gaze-tracking means sends the gaze-tracking data (i.e., said information) to the at least processor. It will be appreciated that the gaze-tracking data is collected repeatedly by the gaze-tracking means throughout a given session of using the display apparatus, as gaze of the user's eyes keeps changing whilst he/she uses the display appara-tus.

Throughout the present disclosure, the term "processor" refers to the hardware, software, firmware or a combination of these, suitable for controlling the operation of the display apparatus. The at least one processor is communicably coupled with the at least one display or projector and the gaze-tracking means, wirelessly and/or in a wired manner. In particular, the at least one processor is communicably coupled to other components of the display apparatus. It will be appreciated that the term "at least one processor" refers to "one processor" in some implementations, and "a plural-ity of processors" in other implementations.

In some implementations, the at least one processor is implemented as a processor of the display apparatus. In other implementations, the at least one processor is imple-mented as the processor of the display apparatus and a processor of an external computing device, wherein the external computing device is communicably coupled with the display apparatus wirelessly or in a wired manner. In such a case, at least a part of all the aforementioned processing tasks of the at least one processor is performed at the processor of the external computing device. This con-siderably reduces processing burden on the processor of the display apparatus. In some other implementations, the at least one processor is implemented as the processor of the external computing device.

Throughout the present disclosure, the term "gaze direc-tion" refers to a direction in which the user's eye is gazing. The gaze direction may be represented by a gaze vector. Optionally, when processing the gaze-tracking data, the at least one processor is configured to employ at least one of: an image processing algorithm, a feature extraction algorithm, a data processing algorithm. Other suitable algo-rithm(s) can also be employed. Thus, determining the gaze direction of the user allows the at least one processor to track where the user is looking.

Notably, the based on the gaze direction of the user, the at least one processor is able to determine a specific point in the image that coincides with the gaze direction of the user. Throughout the present disclosure, the term "gaze region" refers to a region around the specific point in the image that coincides with the gaze direction of the user. This specific point can be understood to be a gaze point of the user. In other words, the gaze region represents that region of the image, whereon the focus of the user lies. The gaze region corresponds to the gaze direction of the user. Optionally, the gaze region may have well-shaped boundaries that resembles any of a circle, a polygon, an ellipse, and the like. Alternatively, the gaze region may have freeform-shaped boundaries i.e., boundaries that do not resemble any specific shape. Optionally, the gaze region comprises a plurality of pixels including and surrounding the gaze point correspond-ing to the gaze direction of the user. Optionally, the gaze region covers a first pre-defined percentage of pixels in the image. Optionally, the first pre-defined percentage lies in a range of 10 percent to 60 percent.

Throughout the present disclosure, the term "peripheral region" refers to a remaining region of the image that remains after excluding the gaze region from the image that is to be displayed by the at least one display or projector. Optionally, the peripheral region comprises a plurality of pixels surrounding the gaze region. Optionally, the periph-eral region covers a second pre-defined percentage of pixels in the image. Optionally, the second pre-defined percentage lies in a range of 40 percent to 90 percent.

Throughout the present disclosure, the term "image res-toration technique" refers to a technique that improves and enhances an overall visual quality of the image, and thus provides an improved visual experience to the user when the user views the image. Herein, the at least one image restor-ing technique relates to techniques for making changes to certain characteristics of the image, such as reducing blur-riness of the image, reducing a noise factor in the image and the like. Application of the at least one image restoring technique to the image causes the image to appear sharper, clearer, and is overall, of a better quality than without application of the at least one image restoring technique. Hence, a visual experience of the user viewing the image is enhanced.

Notably, the at least one image restoration technique is applied on the image in the iterative manner i.e., the overall visual quality of the image is improved gradually by apply-ing the at least one image restoration technique over the image in a repetitive manner for a certain number of iterations. Herein, the visual quality of the image improves by a certain extent (i.e., by a certain amount or percentage) after each iteration. The at least one processor applies M iterations of the at least one image restoration technique on the gaze region and applies N iterations of the at least one image restoration technique on the peripheral region, where the M iterations are different from N iterations, to ensure that the visual quality of both the gaze region and the peripheral region is improved, thus improving (i.e., increasing) an overall visual quality of the image as a whole. By using different number of iterations, the at least one processor performs the at least one image restoration technique on the gaze region and the peripheral region in a targeted manner such that only a requisite amount of restoration is performed on a given region. For example, if one of the gaze region and the peripheral region require an additional 30 percent improvement in a given characteristic of the image as compared to the other of the gaze region and the peripheral region, the one of the gaze region and the peripheral region would undergo more iterations than the other of the gaze region and the peripheral region. A requisite amount of restoration in a given region could be different for different image restoration techniques. By such a targeted image restoration approach, the processing requirements for apply-ing the at least one image restoration technique on the image are significantly reduced as compared to applying the at least one image restoration technique on the image as a whole. Additionally, a speed of applying the at least one image restoration technique on the image also increases with such a targeted image restoration approach, as compared to applying the at least one image restoration technique on the image as a whole.

It will be appreciated that while the user views the image, the user typically does not focus on an entirety of the image, but rather the focus of the user is fixed on the gaze region. Therefore, typically, the visual quality of the gaze region needs to be improved more significantly in comparison to the peripheral region of the image to improve the overall visual quality of the complete image, as the improvements in the visual quality in the gaze region are noticed (i.e., perceived) to a greater extent by the user in comparison to the improvements made in the visual quality of the peripheral region. On the other hand, when we deal with image noise on peripheral areas (i.e. the areas to which the user is not focusing) approach can be different. This due to human vision being more tuned to find that image noise on peripheral area has bigger negative impact on image quality than in gaze area. Thus image noise reducing algorithms should be more effective in peripheral areas than in gaze area. Also, since many noise reducing algorithms have negative impact on resolution, number of iterations for image restoration technique (in respect to a noise reducing algorithms) in peripheral area can be greater than in the gaze area (since human vision is not accurate from resolution point of view in peripheral area).

Optionally, the at least one image restoration technique comprises a de-blurring technique, and wherein a number of iterations of the de-blurring technique applied on the gaze region is greater than a number of iterations of the de-blurring technique applied on the peripheral region. In other words, M is selected to be greater than N for applying the de-blurring technique. Herein, the "de-blurring technique" refers to the image restoration technique that is used to remove any sort of blurriness (i.e., an effect that causes the images to appear unclear or unsharp) from the image. Notably, applying a high number of iterations of de-blurring technique to any image causes such an image to appear to be of high sharpness (and in turn, appear visually appealing) to the user. In this regard, the de-blurring technique is applied for the greater number of iterations (i.e., M iterations) on the gaze region in comparison to the lesser number of iterations (i.e., N iterations) on the peripheral region, thus making the gaze region appear clearer and sharper in comparison to the peripheral region. This emulates a foveation effect of the human visual system in the image, as a gaze-contingent region of the image, i.e., the gaze region, has higher sharpness as compared to a non-gaze-contingent region of the image i.e., the peripheral region. Upon application of the de-blurring technique, the image appears very realistic i.e., similar to how human eyes view their surroundings. Thus, the de-blurring technique need not be applied on the (complete) image for M number of iterations and hence, beneficially, reduces a load on the at least one processor. For example, when applying the de-blurring technique, M may be selected to be 5 whereas N may be selected to be 3.

Optionally, the at least one image restoration technique comprises a de-noising technique, and wherein a number of iterations of the de-noising technique applied on the peripheral region is greater than a number of iterations of the de-noising technique applied on the gaze region. In other words, N is selected to be greater than M for applying the de-noising technique. Herein, the term "de-noising technique" refers to the image restoration technique that is used to reduce noise levels (i.e., amount of unwanted data signals present in a data related to the image) in the image. Notably, as the noise levels are reduced in any image by applying the de-noising technique to such an image, a signal quality in such an image also decreases. Thus, different number of iterations of the de-noising technique are applied to different regions of the image, such that an overall signal quality of the image is preserved, whilst reducing the noise levels in the image. It will be appreciated that, the noise levels in the peripheral region are perceived easily as compared to the noise levels in the gaze region. In this regard, the de-noising technique is applied for the lesser number of iterations (i.e., M iterations) on the gaze region in comparison to the greater number of iterations (i.e., N iterations) on the peripheral region, thus noise levels in the peripheral region are reduced to a greater extent in comparison to the noise levels in the gaze region that are reduced to a lesser extent, which makes the perception of the noise levels in the peripheral region difficult. Notably, since the noise levels in the gaze region are reduced to the lesser extent, the signal quality of the gaze region is preserved to a greater extent. This emulates a foveation effect of the human visual system in the image, as a gaze-contingent region of the image, i.e., the gaze region, has higher signal quality as compared to a non-gaze-contingent region of the image i.e., the peripheral region, and hence, advantageously, a quality of the image is preserved. Thus, the de-noising technique need not to be applied on the complete image for N number of iterations and hence, beneficially, reduces the load on the at least one processor. For example, when applying the de-noising technique, N may be selected to be 6 whereas M may be selected to be 4.

Optionally, the at least one image restoration technique comprises a demosaicking technique, and wherein a number of iterations of the demosaicking technique applied on the gaze region is greater than a number of iterations of the demosaicking technique applied on the peripheral region. In other words, M is selected to be greater than N for applying the demosaicking technique. Herein, the term "demosaicking technique" refers to an image restoration technique that enables the at least one processor to construct missing pixel values of some pixels in the image from available pixel values of other pixels in the image. The demosaicking technique, thus involves colour reconstruction in case of incomplete colour data of the image being available. Notably, applying a high number of iterations of the demosaicking technique to any image results in a more accurate and complete colour construction in such an image, thus improving a visual appeal of such an image. In this regard, the demosaicking technique is applied for the greater number of iterations (i.e., M iterations) on the gaze region in comparison to the lesser number of iterations (i.e., N iterations) on the peripheral region, thus resulting in more accurate and complete colour construction in the gaze region to in comparison to the peripheral region. This emulates a foveation effect of the human visual system in the image, as a gaze-contingent region of the image, i.e., the gaze region, has more accurate and complete colour construction as compared to a non-gaze-contingent region of the image i.e., the peripheral region. Thus, the demosaicking technique need not to be applied on the complete image for M number of iterations and hence, beneficially, reduces the load on the at least one processor. For example, when applying the demosaicking technique, M may be selected to be 6 whereas N may be selected to be 3.

Optionally, the at least one image restoration technique comprises a super-resolution technique, and wherein a number of iterations of the super-resolution technique applied on the gaze region is greater than a number of iterations of the super-resolution technique applied on the peripheral region. In other words, M is selected to be greater than N for applying the super-resolution technique. Herein, the term "super-resolution" refers to an image restoration technique that enhances a resolution of a given portion of any image, where the given portion with the super-resolution technique applied thereon has a higher pixel count as compared to an original pixel count without the super-resolution technique. Notably, applying a high number of iterations of the super-resolution technique to any image causes such an image to appear to be more detailed as a granularity and resolution of such an image is enhanced. In this regard, the super-resolution technique is applied for the greater number of iterations (i.e., M iterations) on the gaze region in comparison to the lesser number of iterations (i.e., N iterations) on the peripheral region, thus making the gaze region to appear clearer and more detailed in comparison to the peripheral region. This emulates a foveation effect of the human visual system in the image, as a gaze-contingent region of the image, i.e., the gaze region, has higher detailing and clarity as compared to a non-gaze-contingent region of the image i.e., the peripheral region. Thus, the super-resolution technique need not to be applied on the complete image for M number of iterations and hence, beneficially, reduces the load on the at least one processor. For example, when applying the super-resolution technique, M may be selected to be 7 whereas N may be selected to be 5.

Optionally, the at least one image restoration technique comprises a deblocking technique, and wherein a number of iterations of the deblocking technique applied on the gaze region is greater than a number of iterations of the deblocking technique applied on the peripheral region. In other words, M is selected to be greater than N for applying the deblocking technique. Herein, the term "deblocking" refers to an image restoration technique that enables correcting of image artifacts resulting for example from JPEG compression. In this regard, the deblocking technique is applied for the greater number of iterations (i.e., M iterations) on the gaze region in comparison to the lesser number of iterations (N iterations) on the peripheral region, and thus, the compression artefacts in the gaze region is reduced to a greater extent in comparison to the peripheral region. Thus, the de-blocking technique need not to be applied on the complete image for M number of iterations and hence, beneficially, reduces the load on the at least one processor. For example, when applying the deblocking technique, M may be selected to be 7 whereas N may be selected to be 4.

According to one embodiment, the at least one image restoration technique comprises an inpainting technique, and wherein a number of iterations of the inpainting technique applied on the gaze region is greater than a number of iterations of the inpainting technique applied on the peripheral region. In other words, M is selected to be greater than N for applying the inpainting technique. Furthermore as an example inpainting is a process in which missing parts of image are filled in to restore the image. According to one embodiment inpainting can be done in iterative manner.

Optionally, the at least one processor is further configured to identify an intermediate region within the image, wherein the intermediate region surrounds the gaze region and is arranged between the gaze region and the peripheral region, and wherein, when applying the at least one image restoration technique on the image in the iterative manner, a number of iterations of the at least one image restoration technique applied on the intermediate region is different from and lies in between the number of iterations of the at least one image restoration technique applied on the gaze region and the number of iterations of the at least one image restoration technique applied on the peripheral region. In other words, L iterations of the at least one image restoration technique are applied on the intermediate region, L being different from and lying in between M and N. Since the M iterations are different from N iterations, the difference between the visual quality of the gaze region and the peripheral region may be abruptly noticeable to the user, which is undesirable as it creates an unpleasant visual experience for the user. Thus, the intermediate region is identified between the gaze region and the peripheral region, and L iterations of the at least one image restoration technique are applied to the intermediate region, in order to gradually provide the difference in the visual quality of the gaze region and the peripheral region. Subsequently, the L iterations of the at least one image restoration technique are applied to the intermediate region, where L number of iterations lie between M and N, so that the visual quality of the intermediate region lies in between that of the gaze region and the peripheral region. Thus, difference in the visual quality of the peripheral region, intermediate region, and the gaze region respectively, appears to be more gradual and is realistically perceivable to the user. Hence, beneficially, the visual experience of the user while viewing the image in the display apparatus is enhanced. For example, when applying the at least one image restoration technique, M may be selected to be 8 whereas L may be selected to be 6, and N is selected to be 3.

Indeed, one purpose of image restoration (IR) is to recover the latent clean image x from its degraded observation y=T (x)+n, where T is the noise-irrelevant degradation operation, n is assumed to be additive white Gaussian noise (AWGN) of standard deviation sigma. By specifying different degradation operations, one can correspondingly get different IR tasks. According to one example IR tasks would be image denoising when T is an identity operation, image deblurring when T is a two-dimensional convolution operation, image super-resolution when T is a composite operation of convolution and down-sampling, colour image demosaicking when T is a colour filter array (CFA) masking operation. Other possible IR tasks are JPEG (joint picture expert group format) or other compression related deblocking artifacts removal and image inpainting.

Since IR is an ill-posed inverse problem, the prior which is also called regularization needs to be adopted to constrain the solution space. From a Bayesian perspective, the solution ^x can be obtained by solving a Maximum A Posteriori (MAP) estimation problem (equation (1), $$\hat{x} = \arg\max_{x} \log p(y \mid x) + \log p(x), \qquad (1)$$

where log p(y|x) represents the log likelihood of observation y, log p(x) delivers the prior of clean image x and is independent of degraded image y. More formally, equation (1) can be reformulated as $$\hat{x} = \arg\min_{x} \frac{1}{2\sigma^2} \|y - \mathcal{T}(x)\|^2 + \lambda \mathcal{R}(x), \qquad (2)$$

where the solution minimizes an energy function composed of a dataterm $$\frac{1}{2\sigma^2} \|y - \mathcal{T}(x)\|^2 \qquad (3)$$

and a regularization term lambda*R(x) with regularization parameter lambda. Specifically, the data term guarantees the solution accords with the degradation process, while the prior term alleviates the ill-poseness by enforcing desired property on the solution.

Generally, the methods to solve equation 2 can be divided into two main categories, i.e., model-based methods and learning-based methods. The former aim to directly solve the equation 2 with some optimization algorithms, while the latter mostly train a truncated unfolding inference through an optimization of a loss function on a training set containing N degraded-clean image pairs. In particular, the learning-based methods are usually modeled as the bi-level optimization problem where loss function measures the loss of estimated clean image $\hat{x}i$ with respect to ground truth image $xi$. Trainable parameters are found during training process that minimizes this loss function.

Present disclosure, according to one aspect, is based on usage of iterative solutions for IR problem. These are iterative deep learning, plug and play based which can be learning or model based.

Iterative Deep Learning:

Modern and recent architectures of vision-based Convolutional Neural Networks (CNN) have improved detection and prediction accuracy significantly. However, these algorithms are extremely computationally intensive. To break the power and performance wall of CNN computation, one can reformulate the CNN computation into an iterative process, where each iteration processes a sub-sample of input features with smaller network and ingests additional features to improve the prediction accuracy. It may also contain dividing input image into various input sets (sub-bands) e.g using Discrete Wavelet transformation. Upon completion of first computational iteration round first smaller network, the performance is tested or it is known to be satisfactory. If it is unsatisfactory, it could be progressively increased by working on additional input samples (chosen from remaining sub-bands) and/or features form first smaller CNN. Thus each smaller network could either classify based on its input set or feed computed and extracted features to the next network to enhance the accuracy. The proposed approach allows early-termination upon reaching acceptable confidence or accuracy. Furthermore iterative CNN can be arranged as set of u-CNN's, wherein each u-CNN is fed by features extracted from its previous u-CNN as well as from features derived from the input image. We can set number of iterations by deciding if we use output of a particular u-CNN (say number N) or do we feed that to the next u-CNN (number N+1) or not. This has been found out to be particularly computationally efficient way for iterative image restoration. In addition it reduces complexity on the design as number N can be adjusted based on computational resources and target quality level.

Plug and Play:

The main idea of plug-and-play IR (image restoration) is that, with the aid of variable splitting algorithms, such as alternating direction method of multipliers (ADMM) and halfquadratic splitting (HQS), it is possible to deal with the data term and prior term separately. Plug-and-play IR generally involves two steps. The first step is to decouple the data term and prior term of the objective function via a certain variable splitting algorithm, resulting in an iterative scheme consisting of alternately solving a data subproblem and a prior subproblem. The second step is to solve the prior subproblem with any off-the-shelf denoisers, such as K-SVD, non-local means, BM3D. As a result, unlike traditional model-based methods which needs to specify the explicit and hand-crafted image priors, plug-and-play IR can implicitly define the prior via the denoiser. Such an advantage offers the possibility of leveraging very deep CNN denoiser to improve effectiveness.

It is good to note that from one aspect$_{image\ enhancement}$ is different from image restoration in that the first one is designed to emphasize features of the image that make the image more pleasing to the observer, but not necessarily do not produce realistic image (i.e when comparing "perfect" image to restored image there might be statistical deviations which are large but those are not relevant for user which is observing the image ie. from a scientific point of view). Image enhancement techniques (like$_{contrast\ stretching}$ or deblurring by a nearest neighbour procedure) provided by imaging literature use no a priori model of the process that created the image. Image restoration many times utilizes iterative algorithms like iterative sharpening or iterative back propagation algorithms. For example, bilateral filter has been used for iterative Bilateral Back-Projection for Single Image Super Resolution.

Optionally, applying the at least one image restoration technique, the at least one processor is configured to employ at least one of: iterative deep learning, an iterative convolutional neural network (CNN), u-convolutional neural network, a plug and play image restoration model, an off-the-shelf image restoration solution, iterative image enhancement solution, inpainting. Herein, the iterative CNN refers to a neural network model that can be applied iteratively in a same manner to different types of image restoration techniques, and thus, advantageously automates and increases the speed of applying the at least one image restoration technique on the image. Moreover, the plug and play restoration model enables the at least one processor to use a single denoiser that can be applied to different types of image restoration techniques, and thus, beneficially, simplifies and increases the speed of applying the at least one image restoration technique on the image. Similarly, the off-the-shelf image restoration solution employs existing image restoration algorithms and is thus easy to use along with any device or for restoring any image, thereby beneficially simplifying and increasing the speed of applying the at least one image restoration technique on the image.

It will be appreciated that optionally, the at least one processor controls a driver to display the image having the at least one image restoration technique applied thereon, on the at least one display or projector. In this regard, the display apparatus optionally further comprises the driver for controlling the at least one display or projector. Herein, the term "driver" encompasses a "display driver" and/or a "projector driver". The driver is compatible with an operating system of the display apparatus. The driver refers to a device which drives the at least one display or projector to present the image to the user. The driver serves as an interfacing element between the at least one display or projector and the at least one processor. Herein, the driver may be an LCD display driver, an LED display driver integrated circuit (DDIC), a touches controller indicator circuit (TCIC), an LCD projector driver, an LED projector driver, an OLED-based projector driver, or similar. The driver is selected based on a type of the at least one display or projector implemented in the display apparatus. Optionally, the driver is implemented as a semiconductor integrated circuit (IC). Alternatively, optionally, the driver comprises a software module, wherein the software module pertains to a state machine made of discrete logic and a plurality of components.

Optionally, the driver accepts commands and/or data from the at least one processor, using a data communication interface. Examples of the data communication interface include, but are not limited to, a DisplayPort interface, a mobile industry processor interface (MIPI), a high-definition multimedia interface (HDMI), a transistor-transistor logic (TTL) interface, a complementary metal oxide semiconductor (CMOS) interface, and a serial peripheral interface (SPI).

The present disclosure also relates to the method as described above. Various embodiments and variants disclosed above, with respect to the aforementioned first aspect, apply mutatis mutandis to the method.

Optionally, the method further comprising identifying an intermediate region within the image, wherein the intermediate region surrounds the gaze region and is arranged between the gaze region and the peripheral region, and wherein, when applying the at least one image restoration technique on the image in the iterative manner, a number of iterations of the at least one image restoration technique applied on the intermediate region is different from and lies in between the number of iterations of the at least one image restoration technique applied on the gaze region and the number of iterations of the at least one image restoration technique applied on the peripheral region. In other words, L iterations of the at least one image restoration technique are applied on the intermediate region, L being different from and lying in between M and N.

Optionally, the at least one image restoration technique comprises a de-blurring technique, and wherein a number of iterations of the de-blurring technique applied on the gaze region is greater than a number of iterations of the de-blurring technique applied on the peripheral region. In other words, M is selected to be greater than N for applying the de-blurring technique.

Optionally, the at least one image restoration technique comprises a de-noising technique, and wherein a number of iterations of the de-noising technique applied on the peripheral region is greater than a number of iterations of the de-noising technique applied on the gaze region. In other words, N is selected to be greater than M for applying the de-noising technique.

Optionally, wherein the at least one image restoration technique comprises a demosaicking technique, and wherein a number of iterations of the demosaicking technique applied on the gaze region is greater than a number of iterations of the demosaicking technique applied on the peripheral region. In other words, M is selected to be greater than N for applying the demosaicking technique.

Optionally, the at least one image restoration technique comprises a super-resolution technique, and wherein a number of iterations of the super-resolution technique applied on the gaze region is greater than a number of iterations of the super-resolution technique applied on the peripheral region. In other words, M is selected to be greater than N for applying the super-resolution technique.

Optionally, the at least one image restoration technique comprises a deblocking technique, and wherein a number of iterations of the deblocking technique applied on the gaze region is greater than a number of iterations of the deblocking technique applied on the peripheral region. In other words, M is selected to be greater than N for applying the deblocking technique.

Optionally, the at least one image restoration technique comprises an inpainting technique, and wherein a number of iterations of the inpainting technique applied on the gaze region is greater than a number of iterations of the inpainting technique applied on the peripheral region. In other words, M is selected to be greater than N for applying the inpainting technique.

Optionally, applying the at least one image restoration technique, the step of applying the at least one image restoration technique comprises employing at least one of: iterative deep learning, an iterative convolutional neural network (CNN), u-convolutional neural network, a plug and play image restoration model, an off-the-shelf image restoration solution, iterative image enhancement solution, inpainting.

DETAILED DESCRIPTION OF THE DRAWINGS

Referring to FIG. 1, illustrated is a schematic diagram of a display apparatus 100, in accordance with an embodiment of the present disclosure. The display apparatus 100 comprises at least one display or projector (depicted, for example, as a display 102), a gaze-tracking means 104, and at least one processor (depicted as a processor 106). The display apparatus 100 is also shown to comprise a driver 108 for the display 102. Herein, the processor 106 is communicably coupled to the gaze-tracking means 104 to receive gaze-tracking data therefrom. The processor 106 processes the gaze-tracking data to determine a gaze direction of a user (and in particular, of a user's eyes). Moreover, the processor 106 identifies a gaze region 110 and a peripheral region 112 within an image 114 that is to be displayed on the display 102, based on the gaze direction of the user. The processor 106 is communicably coupled to the driver 108, and furthermore, is configured to display the image 114 on the display 102, via the driver 108.

It may be understood by a person skilled in the art that the FIG. 1 includes a simplified schematic diagram of the display apparatus 100 for sake of clarity, which should not unduly limit the scope of the claims herein. The person skilled in the art will recognize many variations, alternatives, and modifications of embodiments of the present disclosure. For example, the display apparatus 100 may comprise a projector instead of the display 102. Furthermore, the display apparatus 100 is not limited to the depicted number of displays, projectors, processors, drivers, and the like.

Figures 2A, 2B:
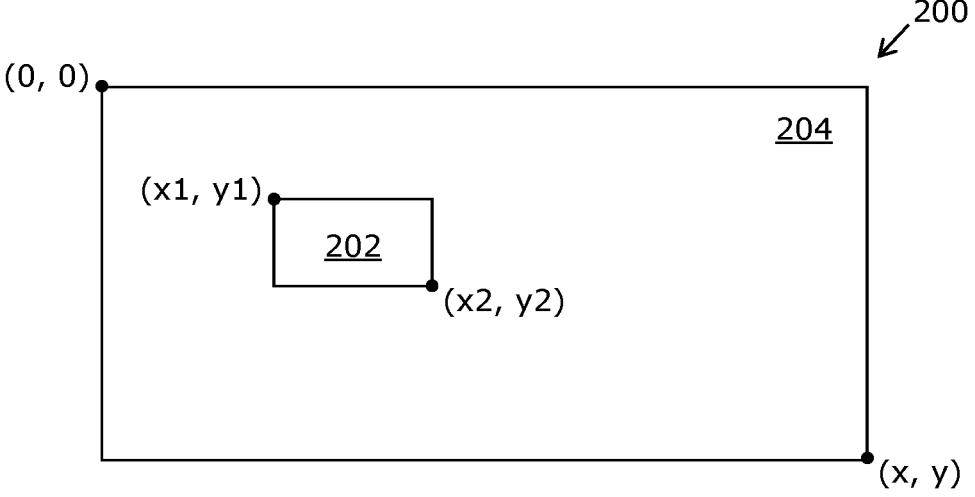
FIGS. 2A and 2B illustrate different regions identified within an image to be displayed by the at least one display or projector, in accordance with different embodiments of the present disclosure.

Referring to FIGS. 2A and 2B, illustrated are different regions identified within an image 200 to be displayed by an at least one display or projector, in accordance with different embodiments of the present disclosure. As shown in FIGS. 2A and 2B, the image 200 has a width of x units and a length of y units. In FIG. 2A, a gaze region 202 having the width x2-x1 units and the length y2-y1 units, and a peripheral region 204 (i.e., a region after excluding the gaze region 202 from the image 200) are identified within the image 200. The gaze region 202 is a portion of the image 200 that corresponds to a gaze direction of a user. In FIG. 2B, the image 200 is shown to also comprise an intermediate region 206 (i.e., the region around the gaze region 202 and arranged in between the gaze region 202 and the peripheral region 204) that is also identified within the image 200.

Figure 3A:
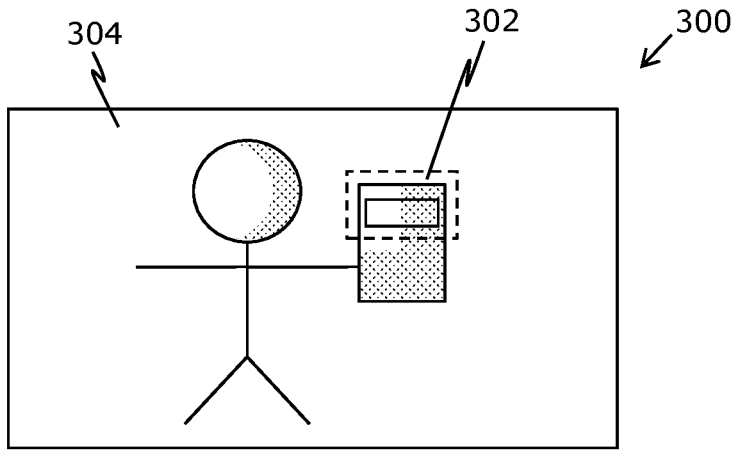
Figure 3B:
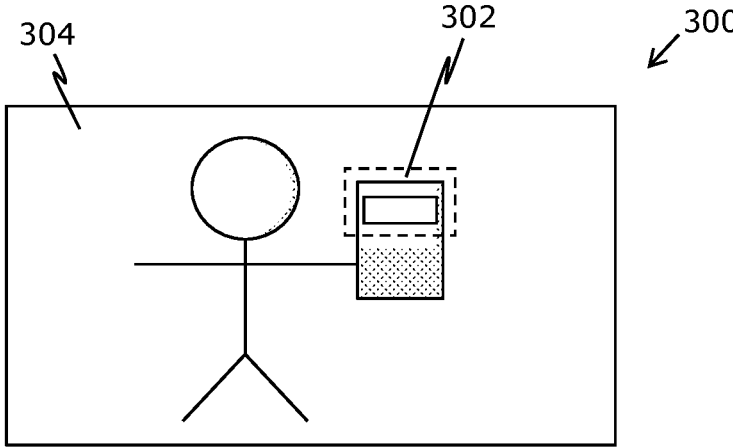
FIG. 3B illustrates the image of FIG. 3A upon application of different number of iterations of the de-blurring technique applied, in accordance with an embodiment of the present disclosure.

Referring to FIGS. 3A and 3B, in FIG. 3A there is illustrated an image 300 upon which a de-blurring technique is to be applied, while in FIG. 3B there is illustrated the image of FIG. 3A upon application of different number of iterations of the de-blurring technique applied, in accordance with an embodiment of the present disclosure. As shown in FIG. 3A, some portions of the image 300 are blurred (the blur being depicted as a dotted hatch), and a gaze region 302 and a peripheral region 304 is identified within the image 300. Notably, M number of iterations of the de-blurring technique are applied to the gaze region 302 and N number of iterations of the de-blurring technique are applied to the peripheral region 304. Herein, the M number of iterations are greater than the N number of iterations. Thus, in FIG. 3B, the gaze region 302 appears more sharper (i.e., less blurry) in comparison to the peripheral region 304. An overall visual quality of the image 300 is higher in FIG. 3B as compared to that in FIG. 3A.

Figure 4A:
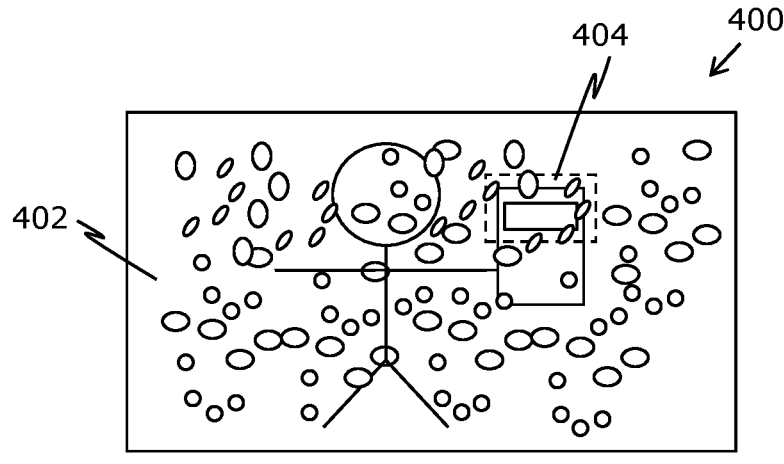
Figure 4B:
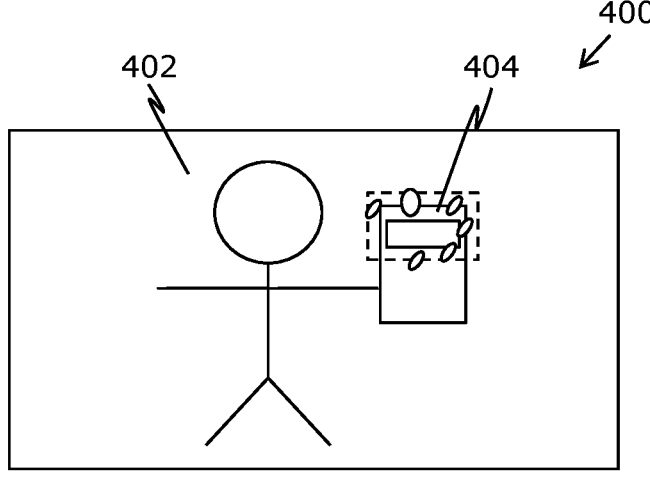
FIG. 4B illustrates the image of FIG. 4A upon application of different number of iterations of the de-noising technique applied, in accordance with an embodiment of the present disclosure.

Referring to FIGS. 4A and 4B, in FIG. 4A there is illustrated an image 400 upon which a de-noising technique is to be applied, while in FIG. 4B there is illustrated the image of FIG. 4A upon application of different number of iterations of the de-blurring technique applied, in accordance with an embodiment of the present disclosure. As shown in FIG. 4A, some portions of the image 400 are having noise signals (the noise signal being depicted as an oval), and a gaze region 402 and a peripheral region 404 is identified within the image 400. Notably, M number of iterations of the de-noising technique are applied to the gaze region 402 and N number of iterations of the de-noising technique are applied to the peripheral region 404. Herein, the N number of iterations are greater than the M number of iterations. Thus, in FIG. 4B, the noise signals in the peripheral region 404 is less perceivable (i.e., less blurry) in comparison to the noise signals in the gaze region 402. An overall visual quality of the image 400 is higher in FIG. 4B as compared to that in FIG. 4A

Figure 5:
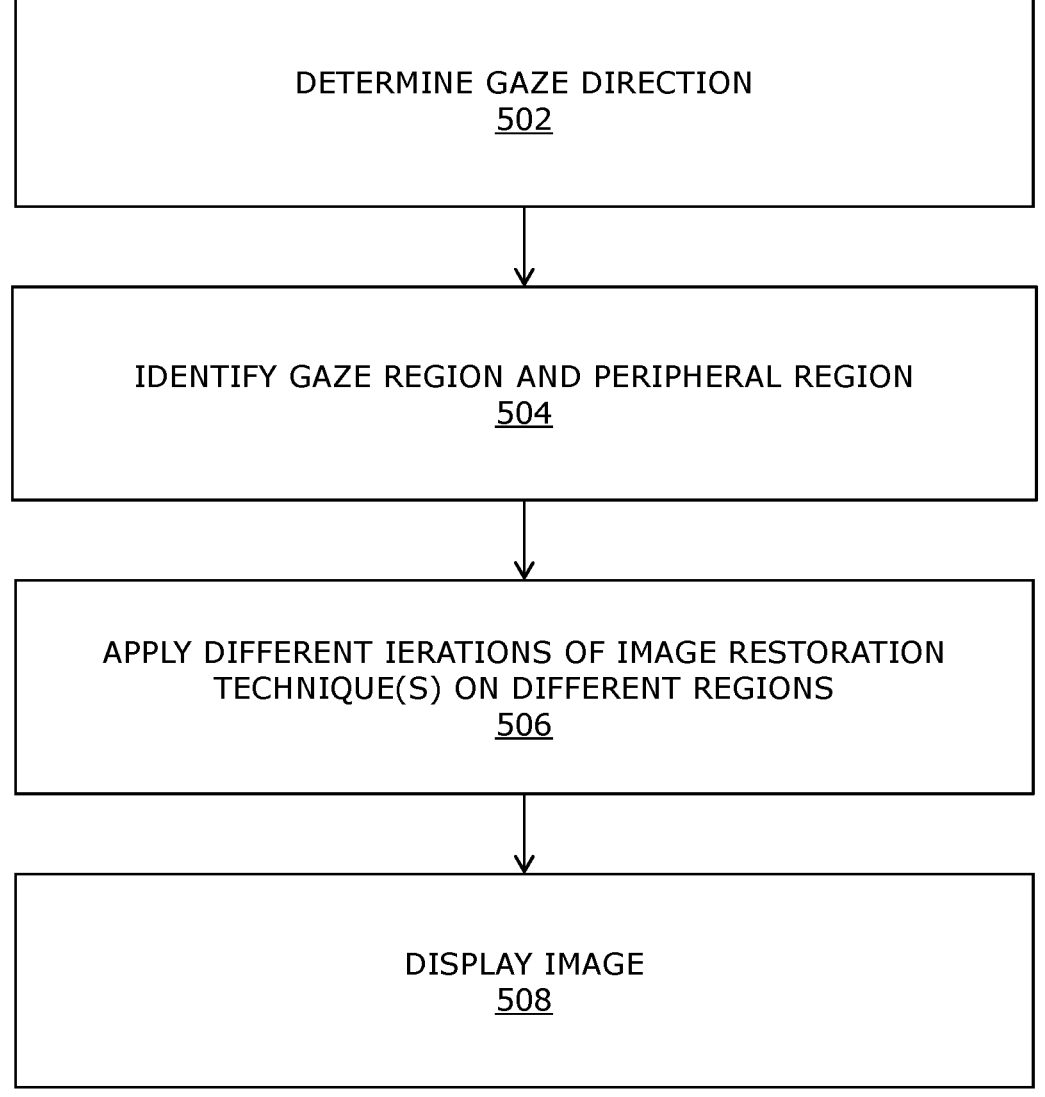
FIG. 5 illustrates steps of a method for image restoration, in accordance with an embodiment of the present disclosure.

Referring to FIG. 5, illustrated are steps of a method for image restoration, in accordance with an embodiment of the present disclosure. At step 502, gaze-tracking data, collected by a gaze-tracking means is processed to determine a gaze direction of a user. At step 504, a gaze region and a peripheral region are identified within an image that is to be displayed by an at least one display or projector, based on the gaze direction. At step 506, at least one image restoration technique is applied on the image in an iterative manner such that M iterations of the at least one image restoration technique are applied on the gaze region, and N iterations of the at least one image restoration technique are applied on the peripheral region, M being different from N. At step 508, at least one display or projector is controlled to display the image having the at least one image restoration technique applied thereon.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus comprising:

at least one display or projector;

a gaze-tracking means; and at least one processor configured to:

process gaze-tracking data, collected by the gaze-tracking means, to determine a gaze direction of a user;

identify a gaze region and a peripheral region within an image that is to be displayed by the at least one display or projector, based on the gaze direction;

apply at least one image restoration technique on the image in an iterative manner such that a number of iterations of the at least one image restoration technique applied is dependent on whether the at least one image restoration technique is applied to the gaze region or the peripheral region; and control the at least one display or projector to display the image having the at least one image restoration technique applied thereon.

2. The display apparatus of claim 1, wherein the at least one processor is further configured to identify an intermediate region within the image, wherein the intermediate region surrounds the gaze region and is arranged between the gaze region and the peripheral region, and wherein, when applying the at least one image restoration technique on the image in the iterative manner, a number of iterations of the at least one image restoration technique applied on the intermediate region is different from and lies in between the number of iterations of the at least one image restoration technique applied on the gaze region and the number of iterations of the at least one image restoration technique applied on the peripheral region.

3. The display apparatus of claim 1, wherein the at least one image restoration technique comprises a de-blurring technique, and wherein a number of iterations of the de-blurring technique applied on the gaze region is greater than a number of iterations of the de-blurring technique applied on the peripheral region.

4. The display apparatus of claim 1, wherein the at least one image restoration technique comprises a de-noising technique, and wherein a number of iterations of the de-noising technique applied on the peripheral region is greater than a number of iterations of the de-noising technique applied on the gaze region.

5. The display apparatus of claim 1, wherein the at least one image restoration technique comprises a demosaicking technique, and wherein a number of iterations of the demosaicking technique applied on the gaze region is greater than a number of iterations of the demosaicking technique applied on the peripheral region.

6. The display apparatus of claim 1, wherein the at least one image restoration technique comprises a super-resolution technique, and wherein a number of iterations of the super-resolution technique applied on the gaze region is greater than a number of iterations of the super-resolution technique applied on the peripheral region.

7. The display apparatus of claim 1, wherein the at least one image restoration technique comprises a deblocking technique, and wherein a number of iterations of the deblocking technique applied on the gaze region is greater than a number of iterations of the deblocking technique applied on the peripheral region.

8. The display apparatus of claim 1, wherein the at least one image restoration technique comprises an inpainting technique, and wherein a number of iterations of the inpainting technique applied on the gaze region is greater than a number of iterations of the inpainting technique applied on the peripheral region.

9. The display apparatus of claim 1, wherein when applying the at least one image restoration technique, the at least one processor is configured to employ at least one of: iterative deep learning, an iterative convolutional neural network, u-convolutional neural network, a plug and play image restoration model, an off-the-shelf image restoration solution, iterative image enhancement solution.

10. A method for image restoration, the method comprising:

processing gaze-tracking data, collected by a gaze-tracking means, for determining a gaze direction of a user;

identifying a gaze region and a peripheral region within an image that is to be displayed by at least one display or projector, based on the gaze direction;

applying at least one image restoration technique on the image in an iterative manner such that a number of iterations of the at least one image restoration technique applied is dependent on whether the at least one image restoration technique is applied to the gaze region or the peripheral region; and controlling the at least one display or projector to display the image having the at least one image restoration technique applied thereon.

11. The method of claim 10, the method further comprising identifying an intermediate region within the image, wherein the intermediate region surrounds the gaze region and is arranged between the gaze region and the peripheral region, and wherein, when applying the at least one image restoration technique on the image in the iterative manner, a number of iterations of the at least one image restoration technique applied on the intermediate region is different from and lies in between the number of iterations of the at least one image restoration technique applied on the gaze region and the number of iterations of the at least one image restoration technique applied on the peripheral region.

12. The method of claim 10, wherein the at least one image restoration technique comprises a de-blurring technique, and wherein a number of iterations of the de-blurring technique applied on the gaze region is greater than a number of iterations of the de-blurring technique applied on the peripheral region.

13. The method of claim 10, wherein the at least one image restoration technique comprises a de-noising technique, and wherein a number of iterations of the de-noising technique applied on the peripheral region is greater than a number of iterations of the de-noising technique applied on the gaze region.

14. The method of claim 10, wherein the at least one image restoration technique comprises a demosaicking technique, and wherein a number of iterations of the demosaicking technique applied on the gaze region is greater than a number of iterations of the demosaicking technique applied on the peripheral region.

15. The method of claim 10, wherein the at least one image restoration technique comprises a super-resolution technique, and wherein a number of iterations of the super-resolution technique applied on the gaze region is greater than a number of iterations of the super-resolution technique applied on the peripheral region.

16. The method of claim 10, wherein the at least one image restoration technique comprises a deblocking technique, and wherein a number of iterations of the deblocking technique applied on the gaze region is greater than a number of iterations of the deblocking technique applied on the peripheral region.

17. The method of claim 10, wherein the at least one image restoration technique comprises an inpainting technique, and wherein a number of iterations of the inpainting technique applied on the gaze region is greater than a number of iterations of the inpainting technique applied on the peripheral region.

18. The method of claim 10, wherein the step of applying the at least one image restoration technique comprises employing at least one of: iterative deep learning, an iterative convolutional neural network, u-convolutional neural network, a plug and play image restoration model, iterative image enhancement solution, an off-the-shelf image restoration solution.

* * * * *